March 28, 1967 MINORU NAGATA ETAL 3,311,756

ELECTRONIC CIRCUIT HAVING A FIELD-EFFECT TRANSISTOR THEREIN

Filed June 19, 1964 6 Sheets-Sheet 1

INVENTOR.
BY Minoru Nagata
Minoru Ono

Wenderoth & Wenderoth

ELECTRONIC CIRCUIT HAVING A FIELD-EFFECT TRANSISTOR THEREIN

Filed June 19, 1964

INVENTOR.
Minoru Nagata
Minoru Ono
BY
Watson & Watson

INVENTOR.
Minoru Nagata
Minoru Ono

BY

Wenderoth & Weston

March 28, 1967 MINORU NAGATA ETAL 3,311,756

ELECTRONIC CIRCUIT HAVING A FIELD-EFFECT TRANSISTOR THEREIN

Filed June 19, 1964 6 Sheets-Sheet 4

INVENTOR.
Minoru Nagata
Minoru Ono

BY

Meston & Meston

March 28, 1967 MINORU NAGATA ETAL 3,311,756

ELECTRONIC CIRCUIT HAVING A FIELD-EFFECT TRANSISTOR THEREIN

Filed June 19, 1964 6 Sheets-Sheet 5

INVENTOR.
Minoru Nagata
Minoru Ono

BY

Wenderoth & Western

ELECTRONIC CIRCUIT HAVING A FIELD-EFFECT TRANSISTOR THEREIN

Filed June 19, 1964

INVENTOR.
Minoru Nagata
Minoru Ono
BY
Mebbern & Mester

United States Patent Office 3,311,756

Patented Mar. 28, 1967

3,311,756

ELECTRONIC CIRCUIT HAVING A FIELD-EFFECT TRANSISTOR THEREIN

Minoru Nagata and Minoru Ono, Kodaira-shi, Japan, assignors to Kabushiki Kaisha Hitachi Seisakusho Tokyo-to, Japan, a joint-stock company of Japan Filed June 19, 1964, Ser. No. 376,322
Claims priority, application Japan, June 24, 1963, 38/32,677; July 13, 1963, 38/37,197
5 Claims. (Cl. 307—88.5)

This invention relates to new electronic circuits in each of which there is used a field effect transistor (FET) provided with at least two gate electrodes.

The term "field-effect transistor" (hereinafter referred to as "FET") is herein used to designate a transistor which is so arranged and constructed as to have an amplification effect through control of current flowing through a channel (current path) by an electric field. Various kinds of construction for such a semiconductor element have been proposed.

The most fundamental FET has a construction wherein a p-type or n-type semiconductor is provided at its ends with source and drain electrodes, the interval between the two electrodes being used as a channel (current path), and a gate electrode is provided on this channel. In this construction, the source and drain electrodes are connected by ohmic contact, but the gate electrode is connected through its formation of a pn junction. The magnitude of the current flowing through the channel is controlled by the magnitude of the voltage applied between the source and drain electrodes.

Technical problems are encountered in the fabrication of the channel layer to a small thickness in such a FET having a pn junction between the channel and gate electrodes. Moreover, because of leakage current of the pn junction, there is a limit to the input resistance.

For a transistor of such a construction, there has been proposed a FET wherein, for example, an n-type channel layer is formed on a p-type semiconductor, source and drain electrodes are provided on the ends of this channel layer, and, at the same time, a gate electrode is provided over an insulating layer on the channel layer, the channel current being controlled by a control voltage applied between the source and gate electrodes. Since in a transistor of this type the gate electrode is formed over an insulating layer, the transistor, in comparison with a transistor in which the gate electrode is formed in a manner to provide a pn junction, has several advantages such as easier fabrication of the channel, adaptability to both positive and negative polarity of control voltage, and substantially high input resistance.

It is to be observed that in a FET of this arrangement whereby a control electric field is applied to the channel layer through an insulator, the channel layer, in effect, is formed on a semiconductor substrate of opposite conductivity type (for example, if the channel layer is of n-type, the semiconductor substrate is of p-type). Then it will be apparent that it is possible to control the current through the channel layer also by utilizing the voltage between the semiconductor substrate and the source electrode.

More specifically, by providing a second gate electrode on the semiconductor substrate forming a pn junction with the channel, in addition to the first gate electrode provided over the insulator, a FET of the tetrode type having two input terminals is obtained.

It is an object of the present invention, in one of its aspects, to provide a FET of the above described character.

It is another object to utilize the above described FET to provide circuits with highly desirable characteristics.

The specific nature, utiliy, and details of the invention will be more clearly and fully apparent by reference to the following description taken in conjunction with the accompanying drawings in which like parts are designated by like reference characters, and in which.

Figure 15:
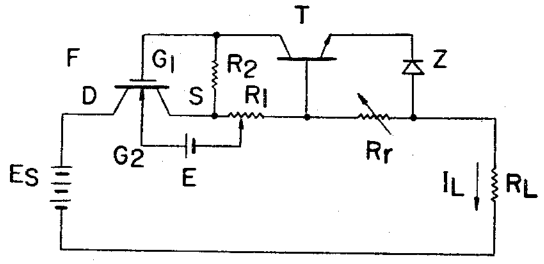
Figure 16:
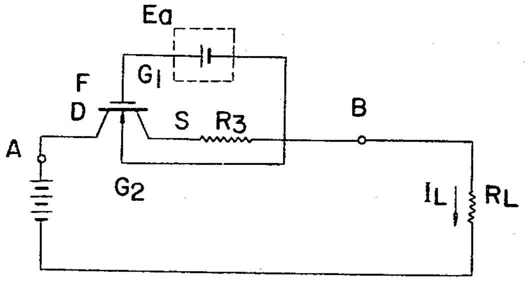
Figure 17:
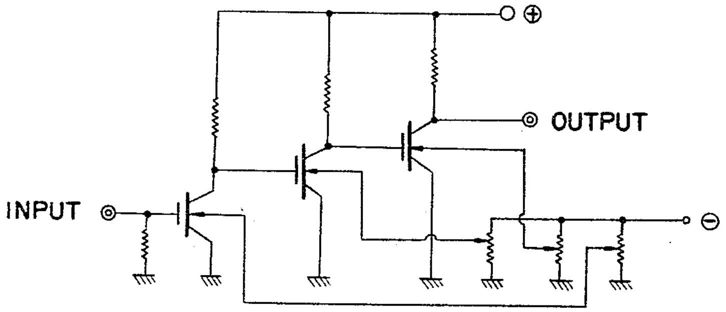
Figure 18:
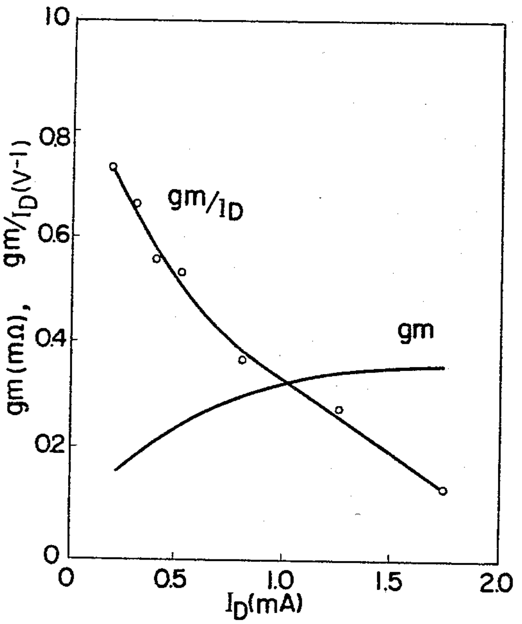
Figure 26:
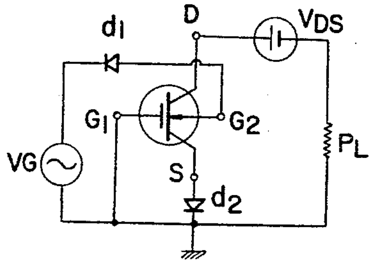
Figure 27:
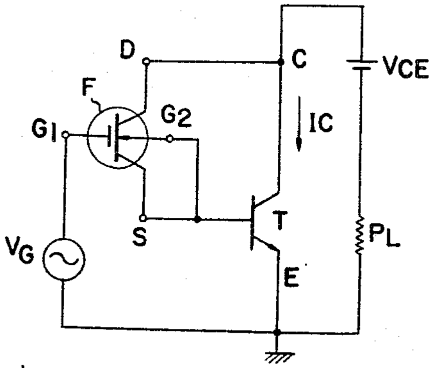
Figure 20:
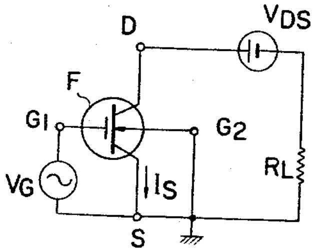
Figure 21:
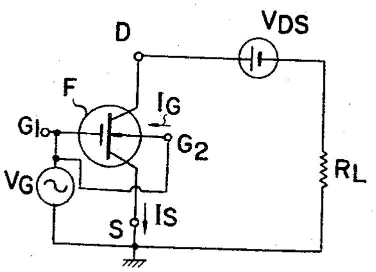
Figure 24:
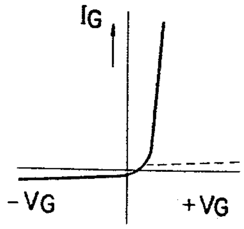
Figure 25:
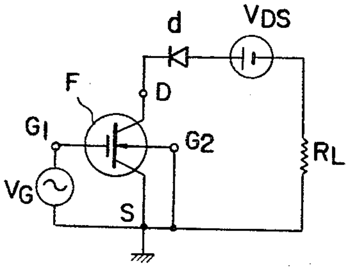

FIGS. 3 through 8, inclusive, and 19*a* and 19*b* are circuit diagrams showing preferred embodiments of the circuit according to the invention;

FIGS. 9 through 14, inclusive are graphical representations showing characteristic curves;

FIGS. 15, 16, and 17 are circuit diagrams showing examples of circuits in which the invention is practically applied;

FIG. 18 is a graphical representation showing characteristic curves;

FIGS. 20 and 21 are circuit diagrams to be referred to for illustrative purpose;

FIGS. 22, 23, 24, and 28 are graphical representations showing characteristic curves; and FIGURES 25, 26, and 27 are circuit diagrams showing other embodiments of the invention wherein safety means are provided.

Figure 1:
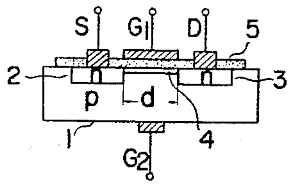
FIG. 1 is a diagrammatic sectional view illustrating one example of a transistor suitable for use according to the invention.
Figure 2:
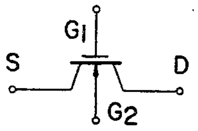
FIG. 2 is a symbolic representation of the transistor shown in FIG. 1.

Referring first to FIG. 1, the FET of the tetrode type shown therein comprises a p-type semiconductor substrate 1 (for example, silicon), n-type regions 2 and 3 formed in the substrate 1 with a space of distance *d* therebetween, a channel layer 4 (n-type) formed between the two n-type regions 2 and 3, an insulating layer 5 (for example, $SiO_2$), a source electrode S and a drain electrode D formed to be in ohmic contact on the n-type regions 2 and 3, respectively, a first gate electrode $G_1$ formed on the upper surface of the insulating layer 5 over an area covering over the channel 4, and a second gate electrode $G_2$ formed on the semiconductor substrate 1. The two n-type regions 2 and 3 are formed in mutually symmetrical disposition and configuration, whereby the source electrode S and the drain electrode D can be used in mutually exchanged dispositions.

A transistor of the above described construction may be fabricated, for example, by the following method. A p-type silicon semiconductor having a thickness of 200 microns, a width of 500 microns, and a length of 2,000 microns and having a resistivity of 2 ohm-cm. is prepared for use as the semiconductor substrate 1. On one surface of this semiconductor, two n-type regions 2 and 3, each of 100-micron width and 5-micron depth and mean resistivity of 0.05 ohm-cm., are formed by diffusion with a space of 30 microns therebetween. Then, on the same surface, in an atmosphere at 1,200 degrees C. of oxygen containing water vapor, a layer 5 of $SiO_2$ of a thickness of 3,000 angstroms is formed. Next, portions of the $SiO_2$ layer immediately above the n-type regions 2 and 3 are locally removed to expose parts of the n-type regions 2 and 3, and a source electrode S and a drain electrode D are respectively connected to these exposed parts. A first gate electrode $G_1$ is secured onto the outer surface of the $SiO_2$ layer 5 in a manner to cover and span over the space between the n-type regions 2 and 3, and a second gate electrode $G_2$ is connected to the semiconductor substrate 1.

Thereafter, with the semiconductor device in the state wherein a D.-C. voltage of 10 volts is applied between the first and second gate electrodes $G_1$ and $G_2$ in the direction such that the electrode $G_1$ becomes positive relative to the electrode $G_2$, the device is heat treated for 30 minutes at a temperature of 350 degrees C., whereupon an excellent channel layer 4 is formed therein. Thus, the two gate electrodes $G_1$ and $G_2$ are provided primarily for use during the operation of the transistor by connection to a voltage source as will be described hereinafter, but they can be conveniently utilized also during the fabrication of the transistor for forming the channel layer.

It is a specific object of the present invention to provide, through effective utilization of the two gate electrodes of a field-effect tetrode of the above described character, an electronic circuit having a unique arrangement and composition in its means to apply bias voltage or input control voltage.

The specific nature of this circuit of the invention will be best understood from the following description with respect to preferred embodiments thereof.

The field-effect tetrode as shown in FIG. 1 is provided with a first gate electrode $G_1$ to control, through the insulator, the channel current and a second gate electrode $G_2$ capable of controlling, through a pn junction, the channel current. Therefore, if a bias voltage is impressed on either one of the gate electrodes $G_1$ and $G_2$ or across these two electrodes, variables such as the mutual conductance *gm* and the magnitude of the drain current $I_D$ at the time of input control voltage $V_g=0$ can be set at will by selecting the magnitude of the bias voltage, whereby the design of the circuit is greatly facilitated.

More specifically, the present invention contemplates the provision of an electronic circuit arranged to impress voltage from a source on both of the two gate electrodes $G_1$ and $G_2$ of a field-effect tetrode as shown in FIG. 1. It is important to supply the control voltage to be applied to these gate electrodes from a voltage source having a low internal resistance. That is, since the gate electrode $G_1$ and the inversely biased gate electrode $G_2$ both have very high input impedances, when a current source is connected, the potentials of these electrodes readily float and are subject to the influence of the potential due to static electricity of the objects in the atmosphere, or noise is induced, and stable operation becomes impossible. If the internal resistance of the voltage source is amply small compared with the input resistance of the gate resistances $G_1$ and $G_2$, good results can be obtained. Furthermore, for high frequencies, bypassing may be resorted to also by means of a capacitor to lower the impedance.

Figures 3, 4, 5:
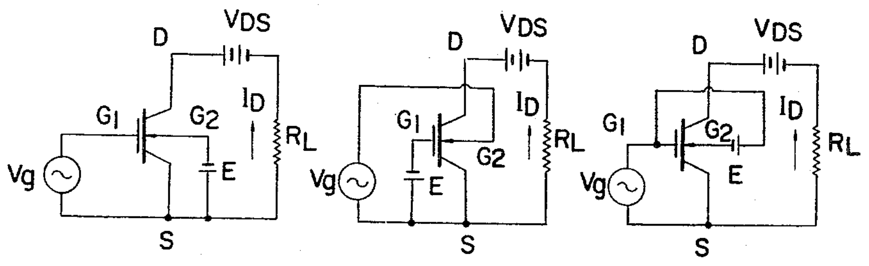

One embodiment of the invention as shown in FIG. 3 illustrates the case wherein the first gate electrode $G_1$ is connected to the source of an input control voltage $V_g$, and a bias voltage source E is connected between the second gate electrode $G_2$ and a source S. The circuit contains also a load $R_L$ and a driving power source to supply a source voltage $V_{DS}$.

Another embodiment of the invention as shown in FIG. 4 illustrates the case wherein the source of the input control voltage $V_g$ is connected to the second gate electrode $G_2$, and a bias voltage supply E is connected between the first gate electrode $G_1$ and the source S.

Still another embodiment of the invention as shown in FIG. 5 illustrates the case wherein the bias voltage source E in the case shown in FIG. 3 is connected between the two gate electrodes $G_1$ and $G_2$.

In each of the above circuits shown in FIGS. 3, 4, and 5, the positions of the source S and the drain D may be mutually exchanged.

Figure 6:
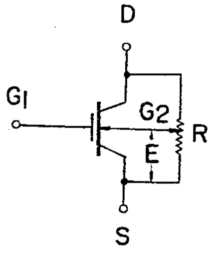

For the bias voltage E in each of the above described circuits, the voltage of the driving power source $V_{DS}$ may be divided, for example, by a resistance R as indicated in FIG. 6 for the case illustrated in FIG. 3, and the resulting divided voltage may be supplied as the bias voltage E. In this case, since a pn junction is interposed between the gate electrode $G_1$ and the source S, the bias voltage E as described above is impressed in the reverse direction.

Figure 7:
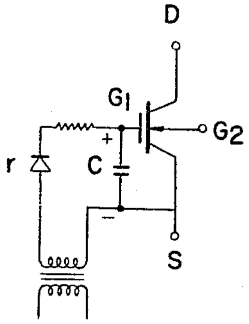

In the case where the bias voltage is applied to the first gate electrode $G_1$ as shown in FIG. 4, since this gate electrode $G_1$ is mounted on an insulator, an independent voltage source may be used for the bias voltage E. Accordingly, the bias voltage source can be formed in a simple manner, and there is afforded the advantage of extremely low (almost zero) bias power. For the bias voltage source in this case, it is possible, for example, to rectify an alternating-current voltage as shown in FIG. 7 by means of a diode *r* to obtain a direct-current voltage. In this case, the insertion of a capacitor C as shown is effective in eliminating adverse effects due to induction or internal feedback. If a precharged capacitor is used for the capacitor C, a stable bias can be applied for a long time by means of only this capacitor.

Figure 8:
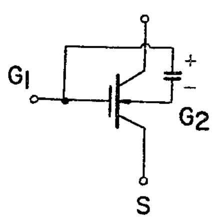

A significant advantage to be observed here is that, since the gate electrode $G_1$ is mounted on an insulator, either a positive or negative voltage can be applied, whereby there is a great freedom of choice. The same features apply also to the case illustrated in FIG. 5, and the mere connection of a precharged capacitor C as shown in FIG. 8 is sufficient.

While certain particular examples of bias voltage sources have been described above, various kinds of sources may be used. Examples are: constant-voltage elements such as storage cells, rectifying power supplies, and constant-voltage diodes; divided voltage from other power sources; charged capacitors; and combinations of current sources and resistances. The requisite condition is that the source supply bias in the form of voltage. If, from among these sources, a source in which self-consumption can be neglected in the case when current is not required, for example, as in an air cell, is used, switches will be unnecessary, and the resulting circuit will be highly effective in actual practice. Furthermore, the bias voltage E may be in synchronism with the input signal $V_g$ or with the power source voltage $V_{DS}$, or it may be independent of these voltages.

Figure 9:
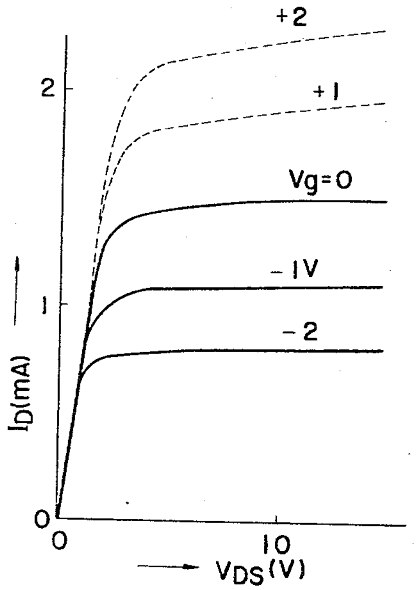
Figure 10:
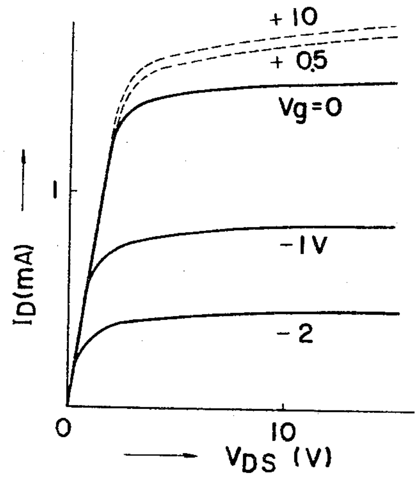
Figure 11:
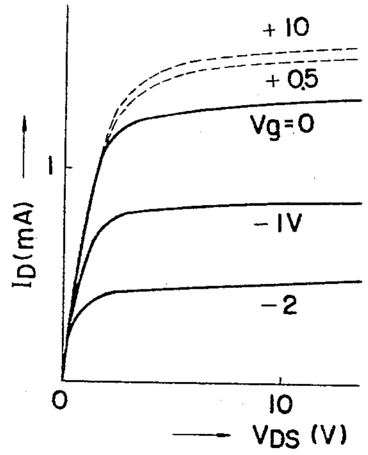

Next, the characteristics of the various above described circuits will be considered. First, in the case of bias voltage $E=0$ (terminals of E shorted) in the circuits of FIGS. 4, 5, and 6, the $V_{DS}$–$I_D$ characteristics with respect to the input voltage $V_g$ are respectively as indicated in FIGS. 9, 10, and 11. The curves for the case of $V_g>0$ become different in FIGS. 10 and 11 depending on the magnitude of the signal source impedance. The current $I_D$ increases for $V_g>0$ with decrease in the signal source impedance. When the signal impedance is high in the proximity of the current drive, the range of $V_g>0$ becomes narrow.

Figure 12:
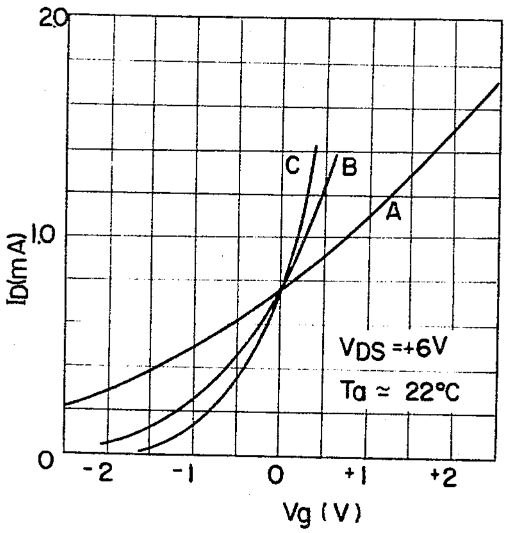
Figure 13:
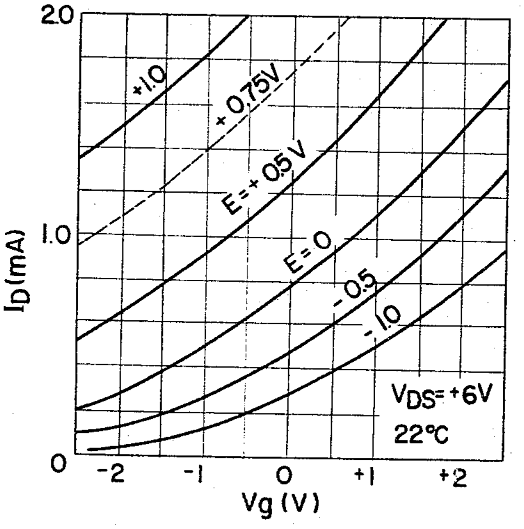
Figure 14:
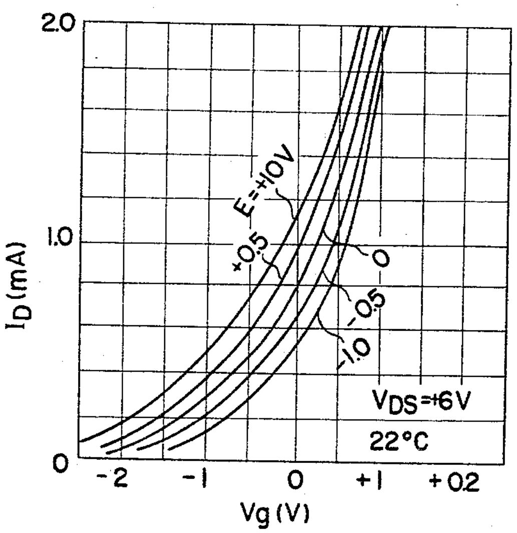

The $V_g$–$I_D$ characteristics for the specific case of $V_{DS}=6$ volts are respectively indicated by curves A, B, and C in FIG. 12. For constant power source voltage $V_{DS}=6$ volts, the $V_g$–$I_D$ characteristics for various bias voltages E are indicated in FIGS. 13 and 14 respectively corresponding to FIGS. 9 and 10.

From these various characteristic curves, the following observations can be made. In the circuit of FIG. 3, since the first gate electrode $G_1$ is mounted over an insulator, the input resistance is extremely high ($10^{13}$ to $10^{15}$ ohms), and it is possible for the input voltage $V_g$, either positive or negative, to control the drain current $I_D$. The case of $V_g>0$ corresponds to the region of the dotted-line curves in FIG. 9. When the input voltage assumes a value of the order of $V_g \geqq +0.5$ volt in each of the circuits of FIGS. 4 and 5, the input resistance decreases remarkably, the signal source resistance becomes high, and, in the case of constant-current drive, there is the undesirable result that linear control cannot be carried out. However, in the range of $V_g \leqq 0$, that is, in the state wherein an input voltage $V_g$ of the reverse bias direction with respect to the pn junction is constantly impressed on the second gate electrode $G_2$, there is the advantage of the mutual conductance gm being greater than that in the circuit of FIG. 3 ($gm \doteqdot 0.2$ to 0.4 milli-mho). The mutual conductance in the circuit of FIG. 4 is of the order of $gm \doteqdot 0.5$ to 0.8 milli-mho, and that in the circuit of FIG. 5 is of the order of $gm=0.8$ to 1.5 milli-mho. It is to be noted that $gm=\Delta I_D/\Delta V_g$. Furthermore, according to FIG. 13, the drain current $I_D$ when $V_g=0$ can be freely controlled by the bias E, and, moreover, the value of gm does not vary widely.

As a result of the above consideration, it can be observed that a circuit of the character shown in FIG. 3 is highly effective when used in a series-controlled, constant-current circuit as shown in FIG. 15. More specifically, in this circuit the difference between the Zener voltage of a Zener diode Z and the terminal voltage of a standard reference resistance $R_r$ is amplified by an npn type transistor T, the output voltage of which (voltage drop across the resistance $R_2$) is impressed across the electrodes $G_1$ and S of a field-effect transistor F to control at a constant value the current $I_L$ (equal to the drain current $I_D$) of a load $R_L$.

In this constant-current circuit, since the impedance between the drain D and the first gate electrode $G_1$ is very high as mentioned hereinbefore, the current which flows through D–$G_1$–T–Z to the load $R_L$ is almost zero even when the power source $E_s$ fluctuates. As a result, it is possible to supply an extremely stable current. Furthermore, since the voltage applied to the gate electrode $G_1$ may be negative, the power for the operation of the transistor $T_1$ can be supplied from the output side through the resistance $R_2$ without the provision of a separate power supply, whereby the circuit is simplified.

A bias voltage from a voltage dividing resistance $R_1$ is impressed on the gate electrode $G_2$. The operational biases of the transistors T and F are controlled at respectively appropriate values by adjusting this resistance $R_1$ and the bias cell E. The setting of the load current is accomplished by adjusting the resistance $R_r$.

The effect of the bias E is as described hereinbelow. If the gate electrode $G_2$ is caused by the bias E to become positive relative to the source S, the gate electrode $G_1$ will become $-R_1$ negative relative to the source S. For this reason, it is possible to select a high value of the load resistance $R_2$ of the transistor T, whereby the voltage gain becomes high, and the stability is improved.

In the case where the above described circuit is formed with the circuit arrangement of the circuit shown in FIG. 4 or FIG. 5, the stability becomes poor because the resistance between the drain D and the gate electrode $G_2$ is low. Although the circuits of FIGS. 4 and 5 have almost the same characteristics, the mutual conductance gm of the circuit shown in FIG. 5 is the highest. Therefore, when the gate electrodes $G_1$ and $G_2$ are mutually shorted as indicated in FIG. 16, and the terminal voltage of a resistance $R_3$ is impressed on these short electrodes, the impedance between the terminals A and B becomes very high, and a constant current can be supplied to the load $R_L$. The setting of the current value can be accomplished in this circuit by providing a bias voltage $E_a$ and adjusting its value, or providing an intermediate tap in the resistance $R_3$ and connecting this tap to the gate electrode $G_1$ or $G_2$.

In the circuit of FIG. 4, since the mutual conductance gm increases with the drain current $I_D$ (as indicated in FIG. 13), it is possible to obtain an amplification circuit of high voltage gain by applying a positive voltage to the first gate electrode $G_1$ as shown in FIG. 7 and impressing an input signal $V_g$ on the second gate electrode $G_2$. In the case where a multistage amplifier or a logical circuit is to be formed by a circuit of this character, since both of the gate electrodes $G_1$ and $G_2$ have high input impedances, it is advantageously possible, by using a voltage dividing resistance to apply respective biases to the various elements from the same bias power source. One example of such an arrangement is illustrated in FIG. 17.

Although, in each of the embodiments of the invention, the mutual conductance *gm* increases with increasing drain current $I_D$, the load must be made small in order to increase the drain current $I_D$. Accordingly, a circuit design cannot be said to be good merely on the criterion of its large mutual conductance *gm*, the magnitude of the load which can be connected being another factor to be considered. Therefore, it is preferable to use a circuit with a range of large value of $gm/I_D$.

Figure 19A:
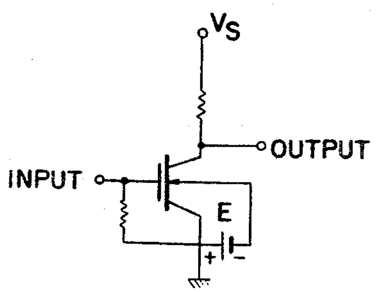
Figure 19B:
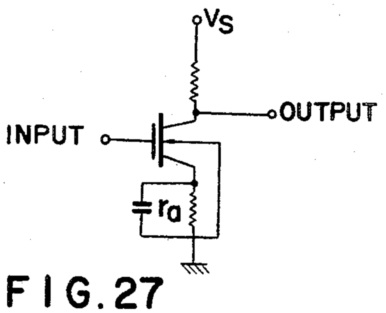

Such a relationship can be represented as shown in FIG. 18 by characteristic curves obtained from the data indicated in FIG. 13. The results indicated in FIG. 18, which correspond to the case illustrated in FIG. 3, clearly indicate that, in order to obtain a large value of $gm/I_D$, it is advantageous to design the circuit so that a bias voltage E is introduced to cause the drain current $I_D$ to be within a small range. For example, by arrangements as shown in FIG. 19, whereby the drain current $I_D$ is biased by a bias voltage E to be of a low value or $I_D$ is biased by a resistance $r_a$ to assume a low value, a high gain for the same power source voltage $V_s$ can be obtained.

The present invention, in another aspect thereof, contemplates the provision of means to prevent overcurrent in an electronic circuit having a FET, as described hereinbelow.

For example, in a circuit as shown in FIG. 20 or FIG. 21, if by error the drain voltage $V_{DS}$ is connected with reverse polarity, or if a voltage in the forward direction is impressed on the second gate electrode $G_2$, a large drain current or a gate current will flow through the channel layer of the transistor F giving rise to the possibility of damage to the elements due to heating. There is also the risk of overcurrent flowing simultaneously through outside circuits connected to the gate electrodes, drain, or source and causing damage thereto. Therefore, in a FET of this type, there is the necessity of providing a protector circuit with respect to overcurrents of the above described nature.

The case where, in the current shown in FIG. 20, the drive voltage $V_{DS}$ is impressed by way of a diode *d* on the drain D is illustrated in FIG. 25. In the circuit shown in FIG. 25, the over-current which would flow from the source S toward the drain D if the voltage $V_{DS}$ were to be connected by error with reverse polarity is suppressed by the inverse resistance of the diode *d*. That is, the $V_{DS}$–$I_S$ characteristic in this case assumes a character as is indicated by dotted line in FIG. 22, and the reverse direction current becomes very small.

Figure 22:
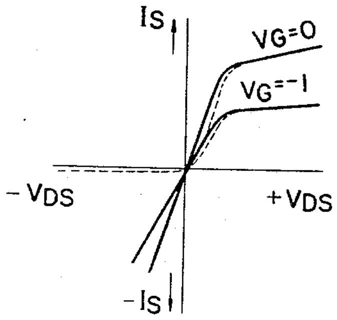
Figure 23:
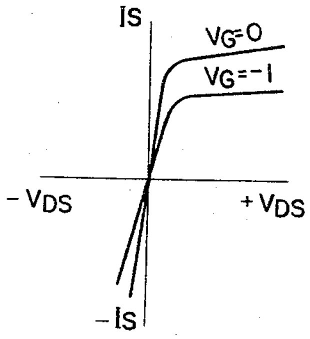

In this case, the voltage applied to the drain is partially consumed because of the forward voltage drop across the diode, and there is the disadvantage of narrowing of the range in which normal operation is possible as indicated in FIG. 22. However, with a FET, the lower limit is determined by the pinch-off voltage and is of the normal 2 to 10 volts, whereby with the use of a silicon diode for the diode *d*, its voltage drop is 1 volt or less, which does not present a problem. If such a procedure were to be followed in the case of an ordinary carrier injection type transistor, the lower limit of the range of possible operation would be greatly impaired.

In the circuit shown in FIG. 25, furthermore, by an arrangement whereby a diode $D_1$ is connected to the second gate electrode $G_2$ to impress thereon a voltage $V_g$, the excessive gate current arising in the case when $V_g>0$ is suppressed. That is, the $V_G$–$I_G$ characteristic in this case assumes the character indicated by the dotted line in FIG. 24, and in either positive or negative voltage $V_G$, the gate current $I_G$ is maintained at a very small value. In this circuit shown in FIG. 26, the diode $d_1$ is connected in the direction opposite that of the pn junction between the second gate electrode $G_2$ and source S (or drain D). Furthermore, the diode designated by reference character $d_2$ fulfills the same function as the diode *d* of the circuit shown in FIG. 9.

Figure 28:
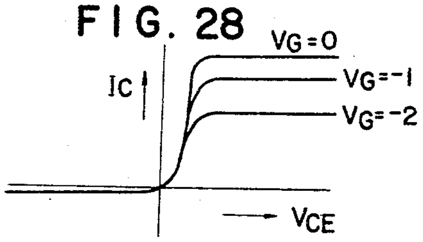

Each of the circuits embodying the invention as shown in FIGS. 24 and 25 is arranged to suppress overcurrent by the interposition of a diode *d* (or $d_1$ and $d_2$) at the time of application of voltage from a voltage source ($V_{DS}$ or $V_G$) to an electrode (S, D, or $G_2$) provided on a pn junction end. However, it is also possible to utilize the pn junction of a current control transistor of ordinary type in place of the abovesaid diode *d*. The circuit shown in FIG. 27 is provided additionally with an ordinary npn-type transistor T and is so arranged that voltage from a voltage source is applied by way of the pn junction between the base and emitter of the transistor T to the drain D and source S of the field-effect transistor F. The characteristics of this circuit are as shown in FIG. 28, which indicates that the reverse breakdown voltage is high, and, moreover, there is the effect of the total mutual conductance being increased by the current amplification factor $\beta$ of the transistor T.

As described above, the present invention provides various circuit arrangements in each of which, to a first gate electrode mounted over an insulator to a field-effect transistor and to a second gate electrode thereof connected through a pn junction, one or two voltage sources are connected to supply to both of said gate electrodes the same voltage or an input voltage to one electrode and a bias voltage to the other electrode. As a result there are provided circuits which have high adaptability and desirable features as high gain, low noise, and in the design of bias means, and which are highly effective in practical applications.

Furthermore, as described above, means to suppress overcurrent in these circuits according to the invention can be formed in a relatively simple manner.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

We claim:

1. A transistor amplifier comprising a field effect transistor provided with a semiconductor substrate; a channel layer formed on said semiconductor substrate; source and drain electrodes fitted on both ends of said channel layer; an insulating layer formed on said channel layer; a first gate electrode fixed on said insulating layer and a second gate electrode fixed on said semiconductor substrate; a bias voltage source; an operating power source; a signal source; a load; means to connect said load and operating power source in series with said source and drain electrodes; means to connect said bias voltage source to one of said first and second gate electrodes; and means to connect said signal source to the other gate electrode.

2. The transistor amplifier as defined in claim 1, wherein said signal source is connected between said first gate electrode and the operating power source, and said bias voltage source is connected between said second gate electrode and the operating power source.

3. The transistor amplifier as defined in claim 1, wherein said signal source is connected between said second gate electrode and the operating power source, and said bias voltage source is connected between said first gate electrode and the operating power source.

4. The transistor amplifier as defined in claim 1, wherein said signal source is connected between said first gate electrode and the operating power source, and said bias power source is connected between said first and second gate electrodes.

5. A transistor amplifier comprising a field effect transistor provided with a semiconductor substrate; a channel layer formed on said semiconductor substrate; source and drain electrodes fitted on both ends of said channel layer; an insulating layer formed on said channel layer; a first gate electrode fixed on said insulating layer and a second gate electrode fixed on said semiconductor substrate; an operating power source; a signal source; a load; a unidirectional current element to control current flowing across the source and drain electrodes of said field effect transistor; means to connect said load, operating power source and unidirectional current element in series across said source and drain electrodes; and means to connect said signal source to the other gate electrodes.

References Cited by the Examiner

UNITED STATES PATENTS

| | | | |
|---|---|---|---|
| 2,980,809 | 4/1961 | Teszner | 307—88.5 |
| 3,177,100 | 4/1965 | Mayer et al. | 330—38 |
| 3,183,128 | 5/1965 | Leistiko | 317—235 |
| 3,191,061 | 6/1965 | Weimer | 307—88.5 |
| 3,202,840 | 8/1965 | Ames | 307—88.5 |
| 3,213,299 | 10/1965 | Rogers | 307—88.5 |
| 3,229,218 | 1/1966 | Sickles et al. | 307—88.5 |

OTHER REFERENCES

IBM Technical Disclosure Bulletin, "Field Effect Transistor Circuits" by L. W. Atwood, vol. 6, No. 9, February 1964.

JOHN W. HUCKERT, *Primary Examiner.*

A. J. JAMES, *Assistant Examiner.*